US012737581B2

(12) United States Patent
Durix et al.

(10) Patent No.: US 12,737,581 B2
(45) Date of Patent: Sep. 15, 2026

(54) METHOD FOR MANUFACTURING A ROLL CARRIER FOR ELECTRONIC COMPONENTS

(71) Applicant: LINXENS HOLDING, Mantes-la-Jolie (FR)

(72) Inventors: Jean-Francois Durix, Mantes-la-Jolie (FR); Sebastien Germain, Mantes-la-Jolie (FR)

(73) Assignee: L:inxens Holding, Mantes-la-Jolie (FR)

( * ) Notice: Subject to any disclaimer, the term of this patent is extended or adjusted under 35 U.S.C. 154(b) by 0 days.

(21) Appl. No.: 19/126,412

(22) PCT Filed: Nov. 3, 2023

(86) PCT No.: PCT/EP2023/080666

§ 371 (c)(1),
(2) Date: May 1, 2025

(87) PCT Pub. No.: WO2024/094848

PCT Pub. Date: May 10, 2024

(65) Prior Publication Data

US 2026/0154522 A1 Jun. 4, 2026

(30) Foreign Application Priority Data

Nov. 3, 2022 (FR) ....................................... 2211440

(51) Int. Cl.
*G06K 19/077* (2006.01)

(52) U.S. Cl.
CPC .............................. *G06K 19/07743* (2013.01)

(58) Field of Classification Search
CPC ................................................ G06K 19/07743
See application file for complete search history.

(56) References Cited

U.S. PATENT DOCUMENTS

| | | | |
|---|---|---|---|
| 5,571,594 A * | 11/1996 | Minowa | B05C 13/02 428/167 |
| 9,016,590 B2 | 4/2015 | Tarantino et al. | |
| 11,412,620 B2 | 8/2022 | Mathieu | |

FOREIGN PATENT DOCUMENTS

| | | |
|---|---|---|
| FR | 2957175 A1 | 9/2011 |
| FR | 3082696 A1 | 12/2019 |

* cited by examiner

*Primary Examiner* — Jamara A Franklin
(74) *Attorney, Agent, or Firm* — McCarter & English, LLP

(57) ABSTRACT

The invention relates to a reel-to-reel process for manufacturing a carrier for electronic components, including a step during which at least one electronic component is transferred to a substrate. The electronic component includes at least one zone called the bonding zone and at least one zone called the connecting zone. The step of transferring the electronic component to the substrate includes bringing said bonding zone of the electronic component into contact with an adhesive face of the substrate, said bonding zone being distinct from said connecting zone. Furthermore, during the transferring step, a fastening zone is left free, on the side of the adhesive face of the substrate, this fastening zone being configured to subsequently receive a layer for fastening the electronic component to a chip card.

13 Claims, 4 Drawing Sheets

[Fig 1]
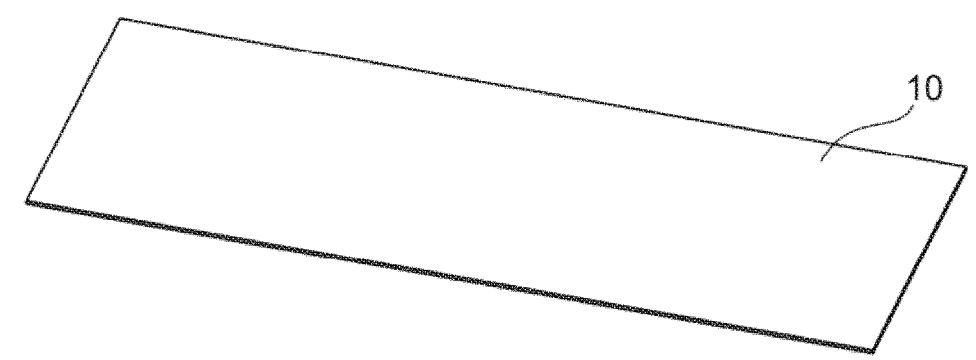
[Fig 2]
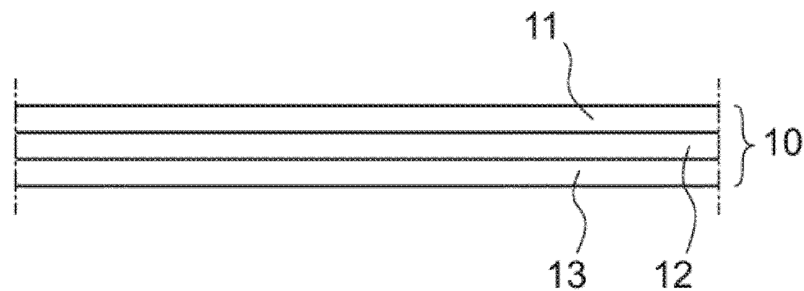
[Fig 3]
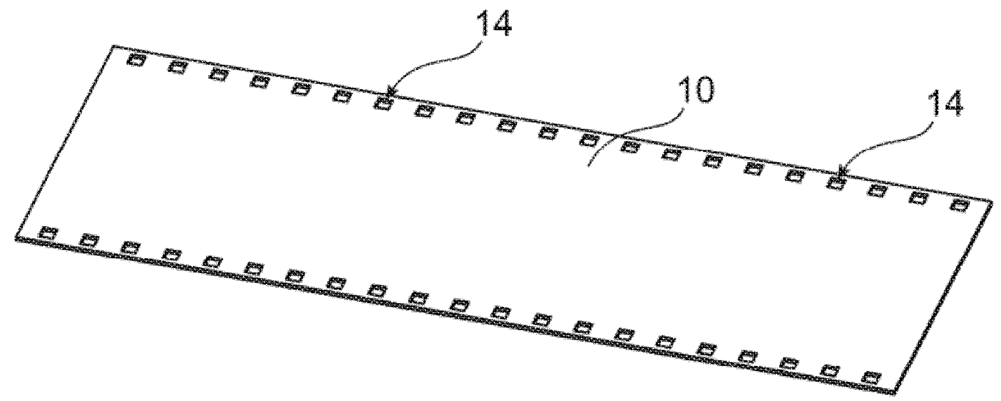

[Fig 4]
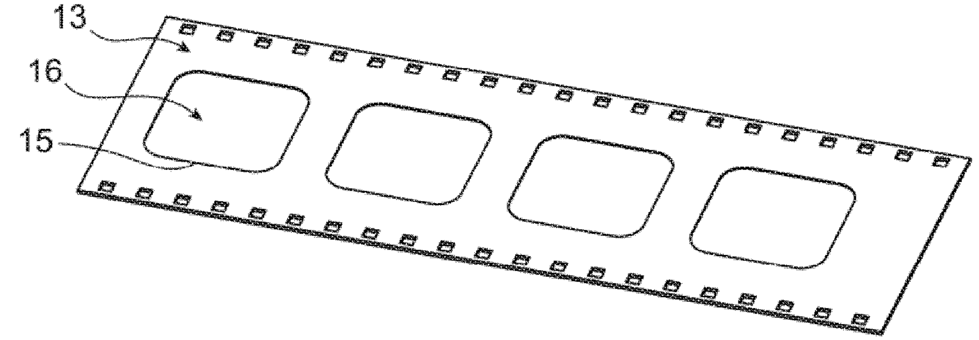
[Fig 5]
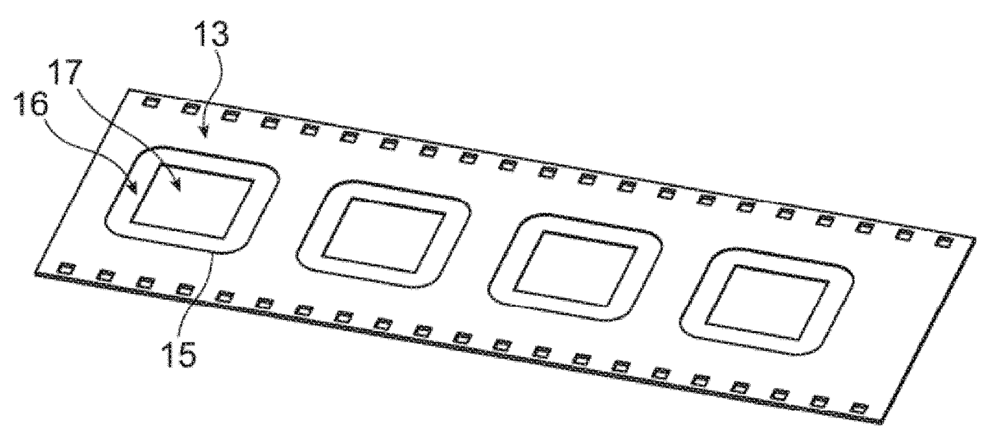
[Fig 6]
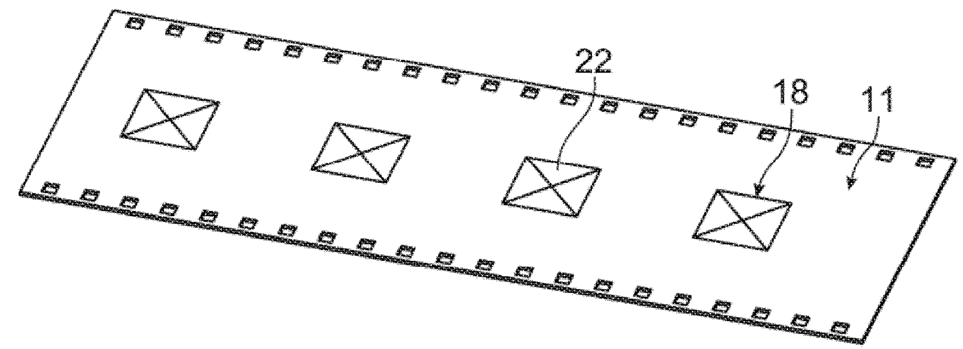

[Fig 7]
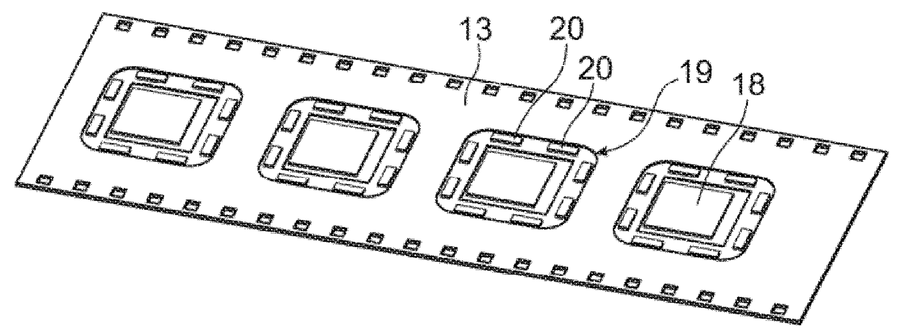
[Fig 8]
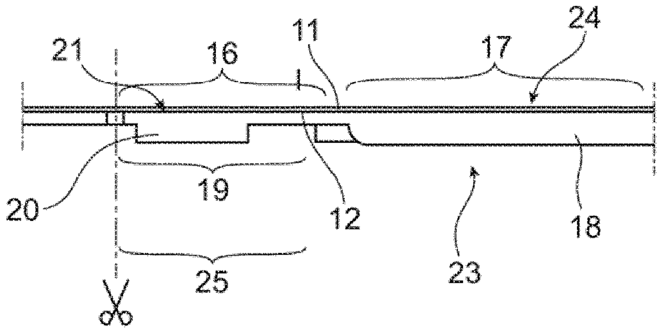
[Fig 9]
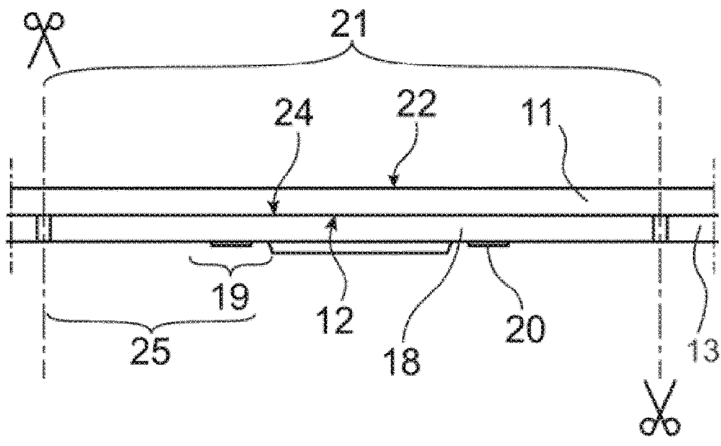

[Fig 10]
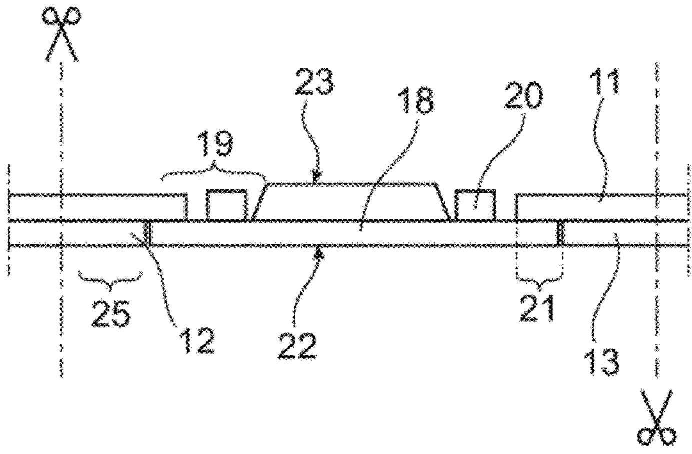
[Fig 11]
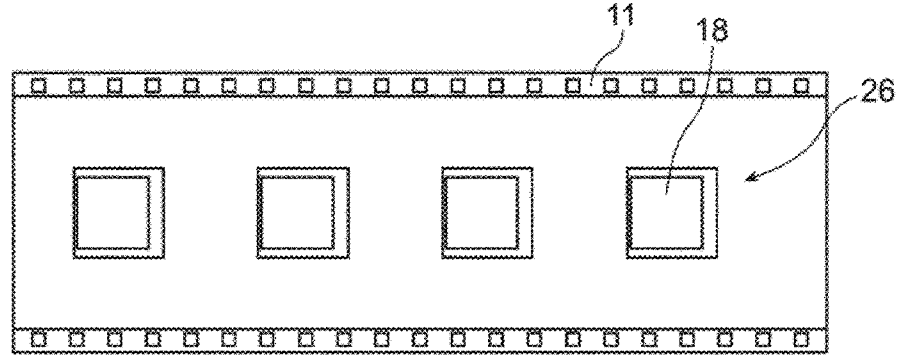
[Fig 12]
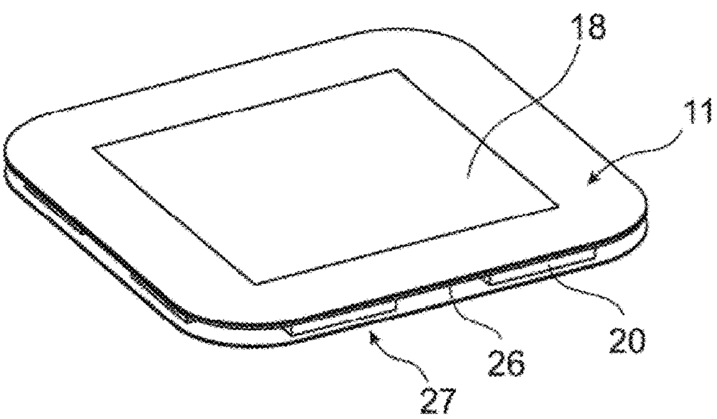

METHOD FOR MANUFACTURING A ROLL CARRIER FOR ELECTRONIC COMPONENTS

CROSS REFERENCE TO RELATED APPLICATION

This Application is a U.S. National Stage application of International Patent Application Number PCT/EP2023/080666 filed Nov. 3, 2023, which is hereby incorporated by reference in its entirety, and claims priority to FR 2211440 filed on Nov. 3, 2022.

TECHNICAL FIELD

The invention relates to the field of manufacture of electronic components, notably electronic components intended to be integrated into and connected to chip cards (bank cards, travel cards, identity cards, etc.).

PRIOR ART

These electronic components may be:

- modules with or without contacts for reading or writing information contained in one or more chips or memories integrated into the module itself or into the card into which the module is integrated—such modules may for example meet the specifications of the standard ISO 7810,
- biometric devices (for example fingerprint readers),
- CVV displays (CVV standing for card verification value),
- remote communication components (for example Bluetooth components),
- etc.

These components must be reliably fastened in a cavity provided in the card receiving them, and may optionally be connected to an antenna and/or flexible printed circuit connecting electronic components integrated into the body of the card, for example between constituent layers thereof. These components may be transferred from one carrier to another using chip transfer techniques. One example of a technique of this kind is described, for example, in document FR3082696A1.

Document FR3082696A1 describes a reel-to-reel process for manufacturing a carrier for electronic components, comprising:

- a step during which a reel of a strip of substrate is unrolled, this substrate having two faces at least one of which is adhesive,
- a step during which at least one electronic component is transferred to the substrate, this electronic component having a rear main face and a front main face, the rear main face comprising at least one zone called the bonding zone, and at least one zone called the connecting zone in which an electrical contact configured to electrically connect the electronic component is placed.

In this prior-art process, to transfer the electronic component to a chip card, a bonding pad is produced with the adhesive present on the substrate. This bonding pad is then used to fasten the component in a cavity provided in the chip card. However, it is common for the operation of transferring and fastening the component to the chip card to be carried out by a different manufacturer from the one who manufactured the reel bearing the components. The manufacturer carrying out the operation of transferring and fastening the component to the chip card is therefore not free to choose the adhesive material. It will also be noted that, in this prior-art process, the bonding pad is applied to the rear main face of the component.

SUMMARY OF THE INVENTION

The aim of the invention is to at least partially overcome these drawbacks.

To this end, a manufacturing process as defined in claim 1 is provided. Notably, this process is a reel-to-reel process for manufacturing a carrier for electronic components, of the type mentioned above, comprising a step of transferring at least one electronic component to a substrate, in which the step of transferring the electronic component to the substrate comprises bringing said bonding zone of the electronic component into contact with the adhesive face of the substrate, said bonding zone being distinct from said connecting zone, and in which, during the step of transferring the electronic component to the substrate, a fastening zone is left free, this fastening zone being configured to subsequently receive a layer for fastening the electronic component to a chip card.

Specifically, by virtue of the process according to the invention, the electronic components may be manufactured, finished and placed at regular intervals on a carrier strip.

In this document, a distinction is made between the “carrier” and the “substrate”, the “substrate” being an element of the “carrier”. The carrier strip is used as a temporary carrier for receiving electronic components. Thus, the electronic components, which have advantageously been finished, may be stored on a reel of carrier, with a view to a subsequent use during which they will be integrated into a chip card. The electronic components thus stored temporarily may then be transferred directly from the carrier strip to a cavity provided in the body of the card, which may optionally be prepared by depositing there an adhesive suitable for fastening each of the components in its respective cavity, this adhesive being different from the adhesive material of the adhesive face of the substrate. Alternatively, between these storing and transferring steps, a fastening layer is applied to the fastening zone.

In this document, the expression “adhesive material” is understood to mean either a material having adhesive properties at room temperature, notably such as a so-called tacky adhesive, or a material that is made adhesive by heating, such as a hot-melt material, etc. The conditions of use will be tailored to its properties.

In this document, the word “zone” (in bonding “zone”, connecting “zone”, etc.) is understood to mean a segment of the surface of the electronic component, this surface segment possibly being on the front face or on the rear face of the electronic component. The expression “bonding zone” is understood to mean a segment of a (front or rear) face of the electronic component, in which the component is held on the adhesive face of the substrate. A bonding zone may be located on the front face or on the rear face of the electronic component.

The carrier strip may comprise a plurality of electronic components across its width. Thus, the process according to the invention makes it possible to produce reels bearing very high numbers of electronic components. These carrier strips comprise two rows of drive holes, but may comprise a variable number of rows of components. Thus, the more rows of components there are across the width of the carrier strips (between the two rows of drive holes), the more the usable area of these carriers may be optimized. The density of electronic components per unit area of a carrier strip may be increased and correspondingly the manufacturing costs per electronic component may be decreased. Alternatively, the electronic components may be produced on flexible strips of greater or lesser width in order to optimize the number of electronic components produced per unit area, then the electronic components are transferred to a carrier strip of lesser width comprising an adhesive material, for example for reasons of compatibility with existing hardware.

The process according to the invention makes it possible to achieve economies of scale by promoting mass production of electronic components.

The process according to the invention may optionally further comprise one or more of the features specified in claims 2 to 12, considered alone and independently of one another, or in combination with one or more others.

According to another aspect, the invention relates to a process for manufacturing chip cards comprising using the reel of carrier obtained in one of the ways indicated above, this process for manufacturing chip cards then comprising a step of transferring the electronic component to a cavity provided in a chip card.

This process for manufacturing chip cards may optionally further comprise one or more of the features specified in claim 13, considered alone and independently of one another, or in combination with one or more others.

BRIEF DESCRIPTION OF THE FIGURES

Other aspects, aims and advantages of the invention will become apparent on reading the detailed description that follows, and in light of the appended drawings, which are given by way of non-limiting example, and in which:

FIG. 1 schematically shows in perspective an unrolled portion of one example of a carrier strip;

FIG. 2 schematically shows in cross section one segment of the carrier strip shown in FIG. 1;

FIG. 3 schematically shows in perspective one segment of the carrier strip shown in FIG. 1, after production of drive holes;

FIG. 4 schematically shows in perspective a segment of the carrier strip shown in FIG. 3, after production of windows;

FIG. 5 schematically shows in perspective a segment of the carrier strip shown in FIG. 3, after production of windows and apertures;

FIG. 6 schematically shows in perspective a segment of the carrier strip shown in FIG. 5, after electronic components have been placed in the windows and apertures, the front face of the electronic components being visible;

FIG. 7 schematically shows in perspective a segment of the carrier strip shown in FIG. 6, after electronic components have been placed in the windows and apertures, the rear face of the electronic components being visible;

FIG. 8 schematically shows in cross section a segment of the carrier strip shown in FIGS. 6 and 7;

FIG. 9 schematically shows in cross section a segment of a carrier strip obtained according to one variant of the process illustrated in FIGS. 1 to 8;

FIG. 10 schematically shows in cross section a segment of a carrier strip obtained according to another variant of the process illustrated in FIGS. 1 to 8;

FIG. 11 schematically shows in elevation a segment of the carrier strip shown in FIG. 6, after application of a fastening layer, the rear face of the electronic components being visible; and FIG. 12 schematically shows in perspective (with the front face of an electronic component essentially visible) a module obtained after singulation of a segment of the carrier strip shown in FIG. 11.

DETAILED DESCRIPTION

The invention is exemplified below with the aid of a number of examples of implementation of the process for manufacturing a reel of carrier for electronic components.

According to one example of implementation of the process according to the invention, it comprises the following steps:

- providing and unrolling a segment of a reel of complex material, forming a flexible carrier 10 (i.e. a carrier that is sufficiently flexible to be used in a reel-to-reel process); the carrier 10 takes the form of a tape (FIG. 1); the carrier 10 comprises a substrate 11 (FIG. 2); the substrate 11 has two main faces, one of these main faces being at least partly covered with an adhesive film 12; alternatively, instead of already being prepared, according to one variant, the substrate 11 is provided in a reel, then unrolled and laminated with an adhesive film 12, to form the carrier 10; generally, it may therefore be said that the substrate 11 has an adhesive face; a protective film 13 may cover the face of the substrate 11 made adhesive by the adhesive film 12 (FIG. 2); alternatively, the composition of the adhesive film 12 is chosen so that the substrate 11 may be rolled back up and unrolled, but the variant described below corresponds to the one in which a protective film 13 is used;
- perforating the carrier 10 resulting from the preceding step so as to create drive holes 14 (FIG. 3) through all of the substrate 11, adhesive film 12 and (optional) protective film 13;
- kiss cutting the protective film 13 and delaminating the latter to form (in the protective film 13) a window 15 in which at least one area of adhesive film 12 is exposed (FIG. 4), i.e. an area of the adhesive face of the substrate 11; this area of the adhesive face of the substrate 11 forms a fastening zone 16 (FIG. 4); alternatively or in a complementary manner, the substrate 11 (with its adhesive film 12) is perforated to form an aperture 17, the fastening zone 16 then being located on the periphery of the aperture 17 (FIG. 5); the kiss cutting may be carried out using a laser or a rotary punch;
- transferring singulated electronic components 18, each respectively in register with one window 15 (and one aperture 17 where applicable) produced in the preceding step; each electronic component 18 then rests at least partly on one fastening zone 16; according to one of the variants described above (the one in which apertures 17 are formed in the adhesive film 12), each electronic component 18 has a face flush with one of the main faces of the substrate 11 (FIG. 6); as illustrated in FIG. 7, each electronic component 18 comprises a connecting zone 19 in which are located contacts 20 configured to electrically connect the electronic component 18 to an electronic circuit (for example formed on an inlay integrated into a chip card);
- winding the carrier 10 bearing electronic components 18 back into a reel.

Alternatively, the carrier 10 is unrolled, one or more of the steps described above are implemented, then the carrier is rolled back up, before carrying out other steps of the process according to the invention, etc.

The electronic components 18 have a rear main face 23 and a front main face 24 (FIG. 8). The rear main face 23 comprises the connecting zone 19. The electronic components 18 are for example biometric sensors for reading fingerprints. In this case, each electronic component 18 comprises an active zone 22 on its front main face 24.

FIG. 8 illustrates a variant of the process according to the invention, in which an aperture 17 is produced in the substrate 11 so as to leave the active zone 22 bare (in FIG. 8, to simplify the drawing, the adhesive film 12 shown has no thickness; furthermore, the cross section of FIG. 8 does not pass through the aperture 17).

As shown in FIG. 8, each electronic component 18 has at least one bonding zone 21 in contact with the adhesive film 12 of the substrate 11. More particularly, each bonding zone 21 of the electronic component 18 makes contact with an adhesive zone 16 of the substrate 11. Each bonding zone 21 is distinct from the connecting zone 19 (in FIG. 8, the connecting zone 19 is on the rear main face 23, while the bonding zone 21 is on the front main face 24). Furthermore, the cutting and transferring steps described above are carried out in such a way as to leave free (when the carrier is unrolled) a fastening zone 25 on the assembly thus produced after the transferring step (this fastening zone 25 is on the same side of the substrate 11 as the adhesive face). This fastening zone 25 is configured to subsequently receive a layer 26 for fastening the electronic component 18 to a chip card (FIG. 11). In FIG. 8, the fastening zone 25 has been shown as being practically in register with the connecting zone 19. In this case, the fastening layer 26 is conductive. For example, it is an anisotropic conductive film (ACF). However, other variants may be envisaged. For example, the fastening layer 26 may cover the entirety of the rear main face 23 of the electronic component 18 (of course, alternatively a greater or lesser extent of the rear main face 23 of the electronic component 18 may be covered with the fastening layer 26). The fastening layer 26 may also cover a region of greater or lesser extent around the rear main face 23 of the electronic component 18, and therefore extend over the protective layer 13 and/or the substrate 11. According to another variant, the fastening layer 26 is not conductive (for example, it is a film of insulating hot-melt material). In this case, the fastening layer 26 may also cover a region of greater or lesser extent on and/or around the rear main face 23 of the electronic component 18, provided that at least the contacts 20 are left uncovered.

The substrate 11 is for example made of one of the following materials:

- a metal such as copper, optionally with a coating of gold, of palladium, or of a white bronze; this coating is for example deposited on the metal by sputtering, electrodeposition, or any other suitable treatment; a metal may be used when the option described above resulting in the formation of apertures 17 is employed; in this case, the metal covers a non-functional portion of the electronic component 18, but does not cover (or in any case not completely) the active zone 22 of the electronic components 18;
- a non-conductor, such as a polyimide or glass-epoxy tape; in this case, the non-conductor may cover a non-functional portion of the electronic component 18, and optionally may not cover the entire active zone 22 of the electronic components 18. This solution makes it possible to add new cosmetic and/or functional functions to the external face of the sensors (e.g. protection from the external environment);
- a transparent film such as a glass film or any other transparent film; in this case, this film may cover a non-functional portion of the electronic component 18, but may also optionally cover the active zone 22 of the electronic components 18 without affecting read-out performance (in the case of a biometric sensor for example). This solution also makes it possible to add new cosmetic and/or functional functions to the external face of the sensors (e.g. protection from the external environment).

The material from which the substrate 11 is made optionally has at least one of the following characteristics:

- thermally resistant (for example, to avoid the need to change the temperatures used during mounting in a chip card);
- thermally conductive (for example, to allow integration into a chip card);
- scratch resistant;
- convertible (i.e. it may be processed, for example so as to form drive holes 14, an aperture 17, etc.);
- it optionally has no influence on the read-out of the sensor if it at least partially covers the active zone 22 (this may depend on the nature of the electronic component 18).

The adhesive layer 12 may be formed from a pressure sensitive adhesive (PSA). If the active zone 22 of the electronic components 18 is covered with the adhesive layer 12, the adhesive layer is advantageously essentially transparent or translucent and must not affect the biometric-sensor functionality of these electronic components 18.

The protective film 13, when employed, may be chosen to provide rigidity to the substrate 11 and/or to facilitate implementation, by a customer, of the product obtained using the process described above, in particular in the case where the carrier 10 is itself a conductive adhesive film. The material of the protective film 13 may be epoxy glass, polyimide, polyethylene terephthalate, etc.

FIG. 9 illustrates the variant of the process according to the invention, in which the active zone 22 is covered with the substrate 11 and adhesive film 12 (in FIG. 9, to simplify the drawing, the adhesive film 12 shown has no thickness).

In the variants illustrated in FIGS. 8 and 9, the electronic component 18 is bonded to the substrate 11 via at least one zone of its front face 24. This zone corresponds to the aforementioned bonding zone 21.

FIG. 10 illustrates yet another variant of the process according to the invention, in which the electronic component 18 is flipped with respect to the variants described above. In other words, the electronic component 18 is bonded to the substrate 11 via at least one bonding zone 21 located on its rear face 23.

A step of laminating a fastening layer 26 to the substrate 11 is carried out after the steps described above (FIG. 11). This step may be implemented by a manufacturer (for example the manufacturer who fastens the electronic component 18 to a chip card) whereas the steps described above are implemented by another manufacturer. The fastening layer 26 is configured to fasten the electronic component 18 in a chip-card cavity. For example, it is formed from a hot-melt material. It may also be a question of an anisotropic conductive layer. In the present case, this material is conductive in the direction of its thickness. The use of a fastening layer 26 makes it possible to fasten the singulated electronic component 18 in its chip-card cavity, but it also makes it possible, provided it is electrically conductive and also covers the connecting zone 19 and its contacts 20, to make a connection with an electronic circuit housed in the chip card.

A cutting step is then carried out around the electronic component 18. This cutting step is for example carried out as represented schematically by the scissors in FIGS. 8, 9 and 10. This cutting step is configured to singulate and separate from the carrier 10 a chip-card module 27 comprising the electronic component 18. This singulated module 27, one example of which is shown in FIG. 12, is then transferred to a cavity provided in a chip card.

The invention claimed is:

1. Reel-to-reel process for manufacturing a carrier for electronic components, comprising a step during which a reel of a strip of substrate is unrolled, the substrate having two faces at least one of which is adhesive, and a step during which at least one singulated electronic component is transferred to the substrate, the electronic component having a rear main face, a front main face, at least one zone called the bonding zone, and at least one zone called the connecting zone in which an electrical contact configured to electrically connect the electronic component is placed, wherein the step of transferring the electronic component to the substrate comprises bringing said bonding zone of the electronic component into contact with the adhesive face of the substrate, said bonding zone being distinct from said connecting zone, the process being characterized in that, at the end of the transferring step, a fastening zone is left free, on the same side of the substrate as the adhesive face of the substrate, the fastening zone being configured to subsequently receive a layer for fastening the electronic component to a chip card.

2. Process according to claim 1, wherein said bonding zone is located on the front main face of the electronic component and the connecting zone is located on the rear face of the electronic component.

3. Process according to claim 1, wherein the fastening zone is located at least partly on the electronic component.

4. Process according to claim 1, wherein the fastening zone is located at least partly on the carrier.

5. Process according to claim 1, comprising a step of cutting at least one aperture in the substrate, the electronic component being placed, during the transferring step, at least partially in register with the aperture.

6. Process according to claim 5, wherein the electronic component is placed, during the transferring step, such that the active zone is located at least partially in register with the aperture.

7. Process according to claim 1, wherein the electronic component is a biometric component with an active zone formed from an area for sensing fingerprints and, during the transferring step, the active zone is placed at least partially in contact with the adhesive face of the substrate.

8. Process according to claim 1, wherein the electronic component is a biometric component with an active zone formed from an area for sensing fingerprints, the rear face being opposite the active zone, and, during the transferring step, the rear face is placed at least partially in contact with the adhesive face of the substrate.

9. Process according to claim 1, wherein the substrate comprises a protective film at least partially covering the adhesive face of the substrate.

10. Process according to claim 9, comprising a step of cutting at least one window in the protective film, the electronic component being placed, during the step of transferring the electronic component to the substrate, in such a way that the electronic component is at least partially located in register with the window.

11. Process according to claim 1, comprising a step of laminating, at least to the fastening zone, a fastening layer configured to fasten the electronic component in a chip-card cavity, the laminating step being carried out after the step of transferring the electronic component to the substrate.

12. Process according to claim 11, wherein the fastening layer at least partially covers the connecting zone and wherein the fastening layer is an anisotropic conductive film.

13. Process for manufacturing chip cards comprising using the reel of carrier obtained via the process according to claim 11, the process for manufacturing chip cards comprising:

a cutting step carried out around each electronic component, the cutting step being configured to singulate and separate from the carrier a chip-card module comprising an electronic component equipped with a segment of the fastening layer, and a step of transferring the chip-card module to a cavity provided in a chip card.

* * * * *